United States Patent [19]
Gross

[11] Patent Number: 5,788,998
[45] Date of Patent: Aug. 4, 1998

[54] ADJUSTABLE THROTTLE WITH FLAT CHANNEL CROSS-SECTION

[76] Inventor: Heinz Gross, Ringstrasse 137, D-64389 Rossdorf, Germany

[21] Appl. No.: 666,572

[22] PCT Filed: Dec. 2, 1994

[86] PCT No.: PCT/EP94/04015

§ 371 Date: Jul. 2, 1996

§ 102(e) Date: Jul. 2, 1996

[87] PCT Pub. No.: WO95/18711

PCT Pub. Date: Jul. 13, 1995

[30] Foreign Application Priority Data

Jan. 4, 1994 [DE] Germany .................. 44 00 069.3

[51] Int. Cl.⁶ ............................................ B29C 47/22
[52] U.S. Cl. .................. 425/145; 425/381; 425/382.4; 425/466
[58] Field of Search ................. 425/381, 382.4, 425/466, 145, 133.1, 133.5, 376.1

[56] References Cited

U.S. PATENT DOCUMENTS

| | | | |
|---|---|---|---|
| 3,884,611 | 5/1975 | Anderson et al. | 425/376 |
| 4,055,389 | 10/1977 | Hayward | 425/466 |
| 4,302,172 | 11/1981 | Hogseth et al. | 425/154 |
| 4,382,766 | 5/1983 | Feuerherm | 425/465 |
| 4,990,079 | 2/1991 | Lorenz | 425/141 |
| 5,066,435 | 11/1991 | Lorenz et al. | 269/40.5 |
| 5,128,034 | 7/1992 | Tomkins et al. | 264/167 |
| 5,273,420 | 12/1993 | Gross et al. | 425/382.4 |
| 5,466,402 | 11/1995 | Lupke | 264/39 |

*Primary Examiner*—Patrick Ryan
*Assistant Examiner*—Iurie A. Schwartz
*Attorney, Agent, or Firm*—Browdy and Neimark

[57] ABSTRACT

The invention relates to an adjustable throttle with which to influence the mass flow within a rectangular flow channel or a flat flow channel with rounded marginal areas. Because of its special design, the throttle has no parting plane perpendicular to the fluid flow direction. The channel height may be modified by this throttle, so that the fluid mass flow may be influenced by changing the local flow channel resistance as a function of its width without creating discontinuities in the flow channel. Because of this continuous change in the geometry of the flow channel, both in the direction of its width and in the flow direction, the whole flow channel is totally free from dead spots.

10 Claims, 5 Drawing Sheets

ADJUSTABLE THROTTLE WITH FLAT CHANNEL CROSS-SECTION

The invention relates to an adjustable throttle having a flat flow channel with a width to height ratio or a circumference to height ratio, respectively, of at least 10 for the guidance of a mass flow of free flowing material, comprising an inlet portion and an outlet portion and a central flow channel portion interconnecting these two channel portions, the flow channel being free from parting planes and free from dead spots throughout the flow channel portion between the flow channel inlet and the flow channel outlet, and its channel height being modifiable, in the central flow channel portion, from the outside by way of adjusting means by elastic deformation of the wall of at least one wall portion by more than 0.1 mm.

BACKGROUND ART

An adjustable throttle of the generic type mentioned above is known from U.S. Pat. No. 3,884,611. In this throttle, the flow channel is plane. A recess is formed in a thick-walled limiting wall of the flow channel in such a way that a thin wall portion is formed. This wall portion, which is equally flat, i.e. plane, in its position of rest, can be deformed in a direction right into the flow channel by screws as adjusting means, i.e. it can be curved slightly, which renders possible an adjustment of the channel height. On the one hand, the possibilities of making an influence on the channel height are limited, since the thin wall portion is elongated, which is possible only to a limited extent. Moreover, after numerous adjusting operations, the material of this thin wall portion will deform plastically, no longer returning elastically into its initial position.

U.S. Pat. No. 3,122,789 teaches an extrusion die which has a straight flow channel. A wall of this flow channel can be deformed by hydraulic pressure for the width of the opening of the slit die to be changed at its outlet portion. Apart from the fact that throttling does not take place in a central flow channel portion between an inlet portion and an outlet portion, the adjusting problems are the same as mentioned above.

OBJECT AND SOLUTION

It is the object of the invention to develop a metal throttle that is adjustable with great sensitivity and by means of which, over the width of the flow channel, a mass flow that passes through can be modified. Further, it is the object of the invention to produce coextruded sheets of a constancy of layer thickness not achievable so far by the use of the apparatus according to the invention.

According to the invention, this object is solved in that the flow channel has a curvature and in that the elastically deformable wall defines the flow channel in the vicinity of the latter's curvature.

Further, it is advantageous if flow channel portions of non modifiable geometry are located before and behind the flow channel portion.

In keeping with another advantageous embodiment, the adjusting range of the adjusting member is at least 0.1 mm.

According to another advantageous embodiment, provision is made, in the vicinity of the adjusting members, for the flow channel to have portions of a channel height H, to which applies: H<5 mm.

It is especially advantageous if the wall, where elastically deformable, has a wall thickness A, to which applies: A<6 mm and preferably 0.5 mm<A<4 mm.

In keeping with yet another advantageous embodiment, the distance of the adjusting members from each other is less than 15 mm.

It is further of advantage if the flow channel is treatable and located in an extrusion die.

According to another advantageous embodiment, the flow channel is located in a coextrusion adapter.

Finally, it is of advantage if the elastically deformable wall defines the flow channel on the latter's outside in the vicinity of the latter's curvature.

The object of the invention is attained by a construction as seen diagrammatically in FIG. 1. The width to height ratio of the flow channel should exceed 10, however preferably amount to 20 to 5000. The adjusting range of the adjusting members 5 should be at least 0.1 mm, preferably 1–1.5 mm, for sufficient modification of the flow channel resistance over the width of the channel to be achieved locally. In order to ensure this adjusting range, the wall 4 should have at least a slight curvature and a wall thickness A of <6 mm, preferably of 0.5 to 4 mm. An adjustment working at a narrow distance over the flow channel width is achieved by the flexibility thus produced of the wall and by as small as possible an adjusting screw distance of <40 mm, preferably of <15 mm.

ADVANTAGE OF THE INVENTION

Figure 1:
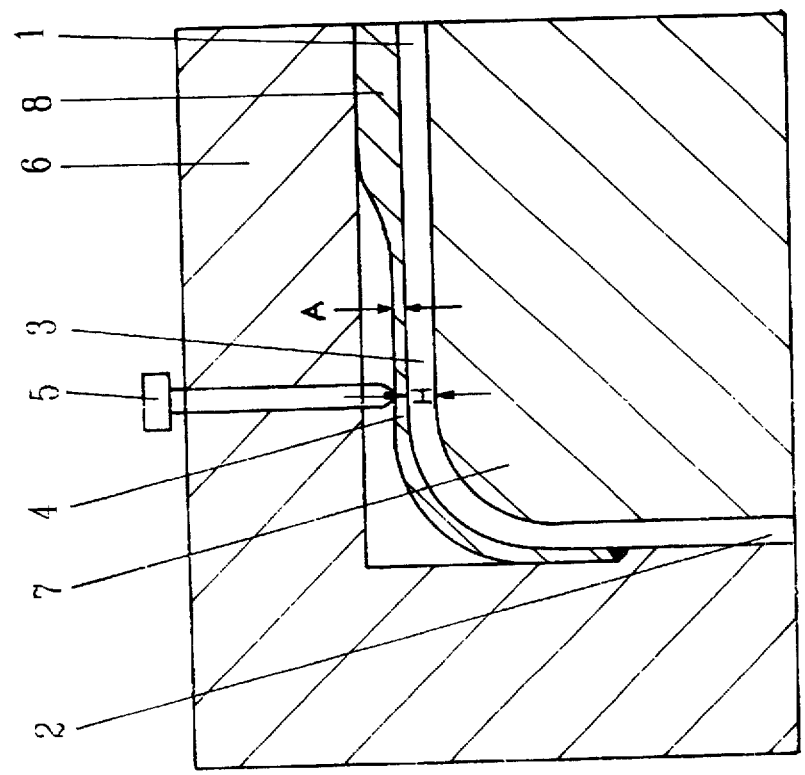
FIG. 1 shows an elevation sectional view of the throttle according to the invention.

Conditioned by the minor thickness A seen in FIG. 1 of the wall 4 of the flow channel portion 3, the wall exhibits high flexibility so that, due to the low deformation forces required, it can be deflected locally defined in the direction of the flow channel 3 with the aid of adjusting screws 5 of small dimensions. The height H of the flow channel 3 through which flow takes place can be modified with great sensitivity, which results in the mass flow being effectively influenced.

The throttle only consists of 3 parts, the upper half 6, the lower half 7 and the central piece 8. As a result, it has no parting plane perpendicular to the flow direction in the vicinity of the flow channel. There are only the two parting planes between the three pieces 6, 7 and 8. They extend in the direction of the flow channel in the two marginal areas of the flow channel, there being almost no risk of material stagnation. Additionally, the risk of leakage is very low. The special construction ensures that the geometry of the flow channel can change only continuously in the flow direction. Consequently, no dead spots can originate due to discontinuities in the flow channel height as is inevitably the case with the baffle beams projecting into the flow channel.

The adjustable throttle described serves to change the total mass flow although the driving pressure difference is constant. This is realized by adjusting all the adjusting members by the same amount. The mass flow distribution over the width of the flow channel can be modified, too. This is realized by adjusting individual adjusting members. This specific throttle construction is especially suitable for influencing thermoplastically workable masses, preferably plastics of all types such as PE; PP; PS; PVC; PMMA; PC; PA; PSU; PES; and PEEK. It is also possible to influence non polymeric masses as long as they exhibit sufficiently free flowing properties.

EMBODIMENTS OF THE INVENTION

Figure 2:
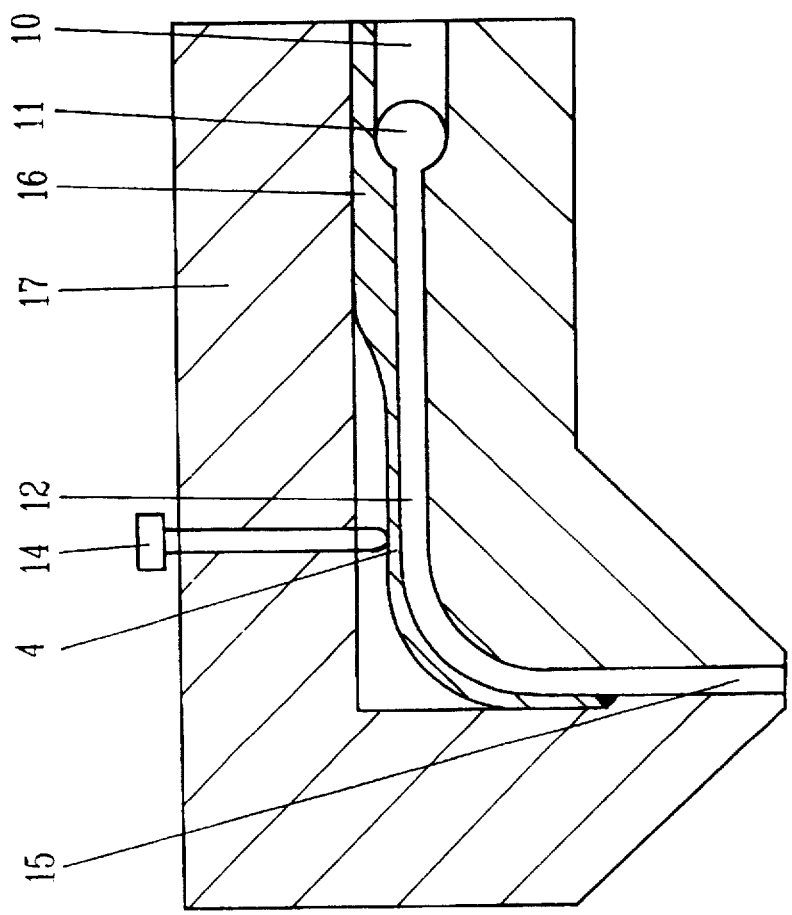
FIG. 2 shows the throttle according to the invention incorporated into an extrusion die for flat plastic sheets.

A throttle of this design can be incorporated in any structural members that have a fluid flowing in a flat flow channel inside of them. The integration into tools as used in plastics processing is of special interest. FIG. 2 illustrates the use in an extrusion die for the production of flat plastic sheets. The melt flows through a narrow melt channel 10 into the die and is distributed in the distribution channel 11 to have the die outlet width. The flexible wall 4, which can be changed locally in spatial position by adjusting means 14, extends over the entire width of the adjoining flow channel portion 12.

This throttle portion is again followed by a channel portion 15 of non modifiable flow channel geometry. The wall 4 has a 90° curvature, which is of advantage in two aspects. Firstly, the flexibility of the wall increases, and secondly, this serves to deflect into the perpendicular the melt flowing from the, as a rule, horizontal extruder into the die. For past experience has shown that the vertical supply of melt into a horizontal smoothing unit is more advantageous than the horizontal supply into a vertical smoothing unit. In this case, the flexible wall is part of a separate central die piece 16, which is screwed to the die half 17 in the vicinity of the inlet channel 10 and soldered or welded to the die half 17 in the vicinity of the channel 15.

Figure 3:
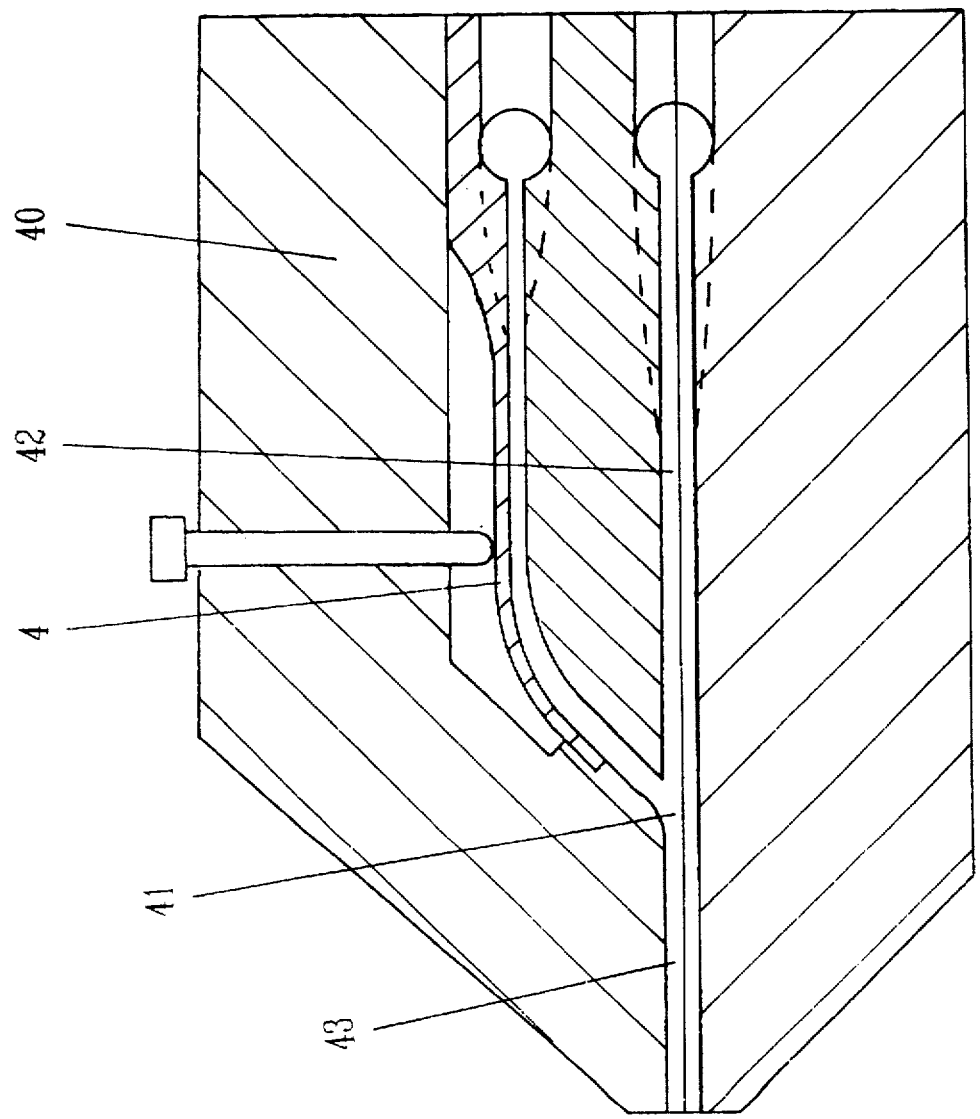
FIGS. 3 and 4 show the throttle according to the invention incorporated into a multichannel die.
Figure 4:
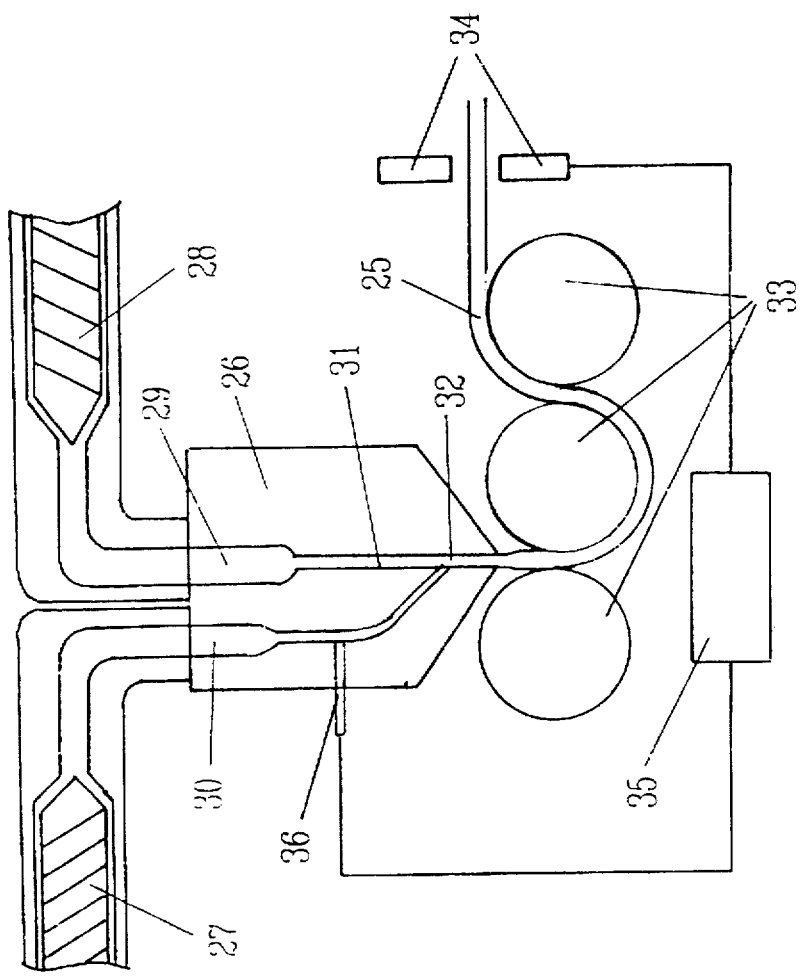

In similar fashion, the throttle may also be incorporated in a multichannel die. Such a solution is seen in FIGS. 3 and 4. In particular in the field of multichannel dies, there is still a deep gap between the requirements of the processing industry and the technological possibilities presently available and known. By integrating the throttle according to the invention in the secondary channel 40, it is possible, over the width, to take influence on the melt flow of the secondary layer before the channel portion 43 in such a way that, in the channel portion 41, a melt flow that is almost constant over the entire channel width can be placed on the main layer melt that flows through the flow channel 42.

For the first time, the throttle integrated in this way into the secondary channel of a multichannel die offers the constructional prerequisites for thickness control of individual layer over the width of the sheet. The constructions of baffle beam adjustment known so far have not been suitable for layer thickness control because of the high adjusting forces needed. Only the flexible lip, which demands only for low adjusting forces and in which the elastic forces of steel and the internal pressure by the fluid provide for restoring force to be available, renders possible a mass flow control of individual layers over the width of the flow channel in dependence on the layer thickness measured at the product.

As shown in FIG. 4, the throttle according to the invention for the first time offers the possibility of controlling the thickness of a secondary layer by means of a control unit in a multichannel die. Two melt flows are produced by the extruders 27 and 28 and fed into the multichannel die 30. By measuring the thickness of the secondary layer after it has left the tool 26 by means of a selective film thickness measuring device 34 and by comparison of the nominal and actual values in a control unit 35, the adjusting means 36 can be triggered specifically, differences in film thickness thus being balanced over the width of the sheet. Nowadays, selective methods of film thickness measuring on a line are available and control algorithms suitable for this job are background art in the field of sheet production. The sheet can be smoothed by means of smoothing rollers 33 and cooled. In the case of a profile, cooling may take place by way of a stationary calibration equipment through which the profile is passed.

Figure 5:
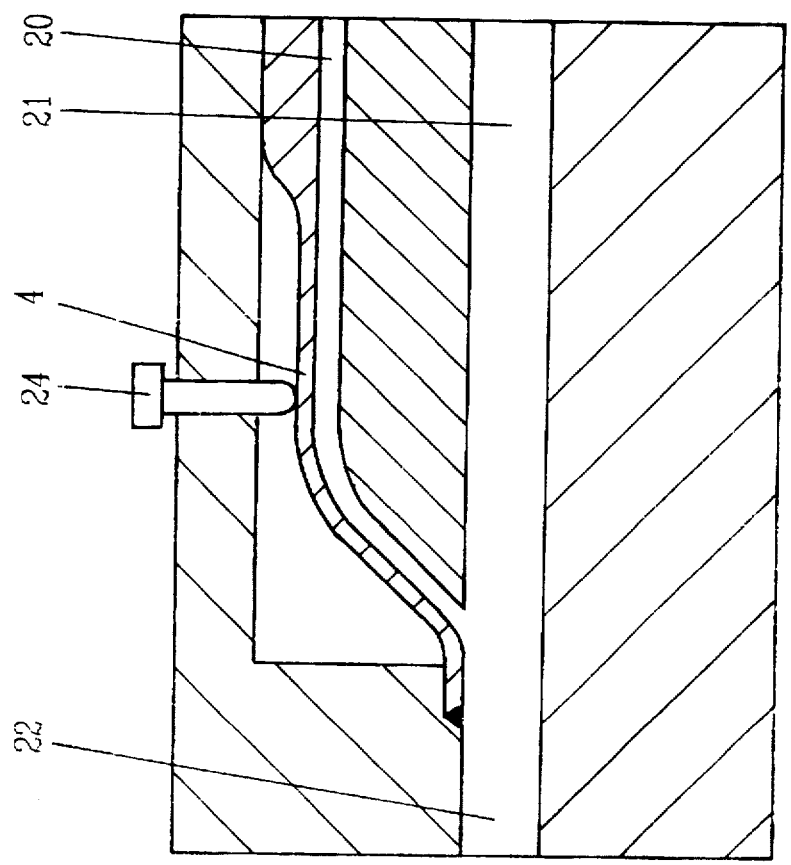
FIG. 5 shows the throttle according to the invention incorporated in a coextrusion adapter.

FIG. 5 illustrates the use of the throttle in a coextrusion adapter. In this case, too, a flow channel portion 20 of non modifiably geometry is located before the actual throttle in the flow channel for the coextrusion melt and another flow channel portion 22 of non modifiable geometry is located at the end, after the coextrusion channel has opened into the flow channel 21 for the main melt. The throttle is formed by the thin wall 4, which can be changed in position by way of adjusting means 24.

In all the types of use, the flow channel resistance can be modified over the width with great sensitivity by actuation of the adjusting members. Undesired differences in melt flow can be balanced over the width of the flow channel. Even a desired melt flow profile can be specifically produced over the width of the flow channel, as is frequently necessary with coextrusion adapters.

Adjustable throttles that are free from dead spots can also be used by advantage for controlling the mass flow ratio in divided flow channels, which are fed for instance by a single extruder. This is often the case with profile dies, where a precise wall thickness relation is to be achieved between different walls that are fed from a single main channel. For instance, it can be highly interesting in the case of ribbed twin slabs to be able to modify, in certain portions, the relation of rib thickness to chord thickness in spite of given flow geometries in the die. If, as in the case of ribbed twin slabs of PC, the chords are coextruded, having a weather resistant film, then it is of great importance to keep a precise pressure ratio in the rib and chord flow channels in order to avoid interfering thickenings or taperings of the coextrusion film in the inlet portion of the ribs. By integrating an adjustable throttle according to the invention into one of the two flow channels, the flow channel resistance relative to the other flow channel can be changed. The results are modified mass flow conditions and modified marches of presssure in the flow channels.

I claim:

1. An adjustable throttle for guidance of a mass flow of free-flowing material, comprising:
    a flat flow channel having a width and a height and a width to height ratio of at least 10;
    an inlet portion (1) of said flat flow channel;
    an outlet portion (2) of said flat flow channel;
    a central flow channel portion (3) interconnecting said inlet portion (1) and said outlet portion (2);
    an elastically deformable wall (4) defining said central flow channel portion (3); and
    adjusting means directed from outside towards said elastically deformable wall (4), wherein said flow channel is free from parting planes perpendicular to a flow direction and free from dead spots throughout said central flow channel portion (3), wherein said central flow channel (3) has a curved bend, wherein said elastically deformable wall (4) defines the flow channel in the vicinity of said curvature, and wherein said height of said flat flow channel is adjustable by more than 0.1 mm by means of said adjusting means.

2. A throttle according to claim 1, wherein flow channel portions of non-modifiable geometry are located upstream and downstream of said central flow channel portion (3).

3. A throttle according to claim 1, wherein said adjusting members have an adjusting range of at least 0.1 mm.

4. A throttle according to claim 1, wherein in the vicinity of said adjusting members, said flat flow channel has portions of a channel height H, to which applies: H<5 mm.

5. A throttle according to claim 1, wherein said elastically deformable wall (4) has a wall thickness A, to which applies: A<6 mm.

6. A throttle according to claim 1, wherein said adjusting members have a distance from each other which is less than 15 mm.

7. A throttle according to claim 1, wherein said flat flow channel is treatable and located in an extrusion die.

8. A throttle according to claim 1, wherein said flow channel is located in a coextrusion adapter.

9. A throttle according to claim 1, wherein said elastically deformable wall (4) defines the flow channel on an outside of said curved bend.

10. A throttle according to claim 5, wherein said elastically deformable wall (4) has a wall thickness A, to which applies: $0.5 \text{ mm} \leq A \leq 4 \text{ mm}$.

* * * * *